US009530415B2

(12) United States Patent
Wilpon et al.

(10) Patent No.: US 9,530,415 B2
(45) Date of Patent: *Dec. 27, 2016

(54) SYSTEM AND METHOD OF PROVIDING SPEECH PROCESSING IN USER INTERFACE

(71) Applicant: AT&T Intellectual Property I, L.P., Atlanta, GA (US)

(72) Inventors: Jay Wilpon, Warren, NJ (US); Giuseppe Di Fabbrizio, Brookline, MA (US); Benjamin J. Stern, Morris Township, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/928,193

(22) Filed: Oct. 30, 2015

(65) Prior Publication Data

US 2016/0049151 A1    Feb. 18, 2016

Related U.S. Application Data

(63) Continuation of application No. 12/128,345, filed on May 28, 2008, now Pat. No. 9,177,551.
(Continued)

(51) Int. Cl.
*G10L 15/00* (2013.01)
*G10L 15/26* (2006.01)
(Continued)

(52) U.S. Cl.
CPC ............. *G10L 15/26* (2013.01); *G06F 3/0416* (2013.01); *G06F 3/162* (2013.01); *G10L 15/22* (2013.01); *G10L 15/30* (2013.01)

(58) Field of Classification Search
CPC ...... G06F 17/243; G10L 15/193; G10L 15/26; G10L 15/24; G10L 15/06; G10L 15/07; G10L 15/30
See application file for complete search history.

(56) References Cited

U.S. PATENT DOCUMENTS 5,865,626 A    2/1999 Beattie et al.
6,023,676 A    2/2000 Erell
(Continued)

OTHER PUBLICATIONS

Chao Huang, Eric Chang, and Tao Chen. "Accent Issues in Large Vocabulary Continuous Speech Recognition (LVCSR)—Microsoft Research." Microsoft Research, Aug. 2001. http://research.microsoft.com/apps/pubs/default.aspx?id=69899 Web, Feb. 27, 2013.
(Continued)

*Primary Examiner* — Abdelali Serrou

(57) ABSTRACT

Disclosed are systems, methods and computer-readable media for enabling speech processing in a user interface of a device. The method includes receiving an indication of a field and a user interface of a device, the indication also signaling that speech will follow, receiving the speech from the user at the device, the speech being associated with the field, transmitting the speech as a request to public, common network node that receives and processes speech, processing the transmitted speech and returning text associated with the speech to the device and inserting the text into the field. Upon a second indication from the user, the system processes the text in the field as programmed by the user interface. The present disclosure provides a speech mash up application for a user interface of a mobile or desktop device that does not require expensive speech processing technologies.

20 Claims, 13 Drawing Sheets

Related U.S. Application Data

(60) Provisional application No. 61/022,668, filed on Jan. 22, 2008.

(51) Int. Cl.
   *G10L 15/22*   (2006.01)
   *G10L 15/30*   (2013.01)
   *G06F 3/041*   (2006.01)
   *G06F 3/16*    (2006.01)

(56) References Cited

U.S. PATENT DOCUMENTS

| | | |
|---|---|---|
| 6,343,270 B1 | 1/2002 | Bahl et al. |
| 6,453,292 B2 | 9/2002 | Ramaswamy et al. |
| 6,594,629 B1 | 7/2003 | Basu et al. |
| 6,751,589 B1 | 6/2004 | Guillemin |
| 7,024,363 B1 | 4/2006 | Comerford et al. |
| 7,124,085 B2 * | 10/2006 | Junqua .................. G10L 15/24 704/235 |
| 7,143,042 B1 | 11/2006 | Sinai et al. |
| 7,210,098 B2 | 4/2007 | Sibal et al. |
| 7,225,125 B2 | 5/2007 | Bennett et al. |
| 7,228,278 B2 * | 6/2007 | Nguyen .................. G10L 15/22 704/231 |
| 7,305,129 B2 | 12/2007 | Chellapilla et al. |
| 7,343,551 B1 | 3/2008 | Bourdev |
| 7,496,511 B2 | 2/2009 | Vora |
| 7,660,400 B2 * | 2/2010 | Bangalore ........ G06Q 10/06311 379/218.01 |
| 7,711,570 B2 | 5/2010 | Galanes et al. |
| 7,739,117 B2 * | 6/2010 | Ativanichayaphong G06F 17/243 704/231 |
| 7,822,603 B1 * | 10/2010 | Parthasarathy ......... G10L 15/07 379/88.16 |
| 7,890,324 B2 | 2/2011 | Bangalore et al. |
| 8,054,990 B2 | 11/2011 | Gratke et al. |
| 8,060,371 B1 * | 11/2011 | Schaedler ............... G10L 15/26 704/270.1 |
| 8,160,883 B2 | 4/2012 | Lecoeuche |
| 8,224,650 B2 | 7/2012 | Galanes et al. |
| 2001/0012997 A1 | 8/2001 | Erell |
| 2002/0004746 A1 | 1/2002 | Ferber et al. |
| 2003/0033146 A1 | 2/2003 | Morin et al. |
| 2003/0046081 A1 | 3/2003 | Koo et al. |
| 2003/0115060 A1 | 6/2003 | Junqua et al. |
| 2003/0182131 A1 | 9/2003 | Arnold et al. |
| 2003/0204498 A1 * | 10/2003 | Lehnert ................. G06F 17/243 |
| 2003/0216960 A1 | 11/2003 | Postrel |
| 2004/0059575 A1 | 3/2004 | Brookes et al. |
| 2005/0080632 A1 | 4/2005 | Endo et al. |
| 2005/0135571 A1 | 6/2005 | Bangalore et al. |
| 2005/0222905 A1 | 10/2005 | Wills |
| 2005/0234725 A1 * | 10/2005 | Agapi ..................... G10L 13/00 704/260 |
| 2006/0009973 A1 | 1/2006 | Nguyen et al. |
| 2006/0041926 A1 | 2/2006 | Istvan et al. |
| 2006/0064302 A1 | 3/2006 | Ativanichayaphong et al. |
| 2006/0074652 A1 * | 4/2006 | Ativanichayaphong G06F 17/243 704/235 |
| 2007/0061243 A1 | 3/2007 | Ramer et al. |
| 2007/0073690 A1 | 3/2007 | Boal et al. |
| 2007/0136069 A1 | 6/2007 | Veliu et al. |
| 2007/0156842 A1 | 7/2007 | Vermeulen et al. |
| 2007/0157075 A1 | 7/2007 | Ritter |
| 2007/0233487 A1 | 10/2007 | Cohen et al. |
| 2007/0255566 A1 | 11/2007 | Nguyen et al. |
| 2009/0270170 A1 | 10/2009 | Patton |

OTHER PUBLICATIONS

V. Diakoloukas et al., "Development of dialect-specific speech recognizers using adaptation methods," Proc. IEEE ICASSP 97, vol. 2, pp. 1455-1458, Apr. 1997.

* cited by examiner

FIG. 6A

REST API (REQUEST)

| PARAMETER | VALUE | DESCRIPTION |
|---|---|---|
| appid | string | APPLICATION ID, UNIQUE APPLICATION IDENTIFIER RELEASED TO REGISTERED USERS |
| cmd | string | THE ASR COMMAND STRING, ANY OF THE FOLLOWING:<br>• START-STARTS THE ASR<br>• STOP-STOPS THE ASR AND RETURN THE RESULTS<br>• AUDIO-AUDIO BUFFER AVAILABLE (IN THE HTTP BODY)<br>• COMPILE-COMPILE THE SPECIFIED GRAMMAR |
| control | string | A SEQUENCE OF CONTROLS. EXAMPLE:<br>set asr.coding = linear;<br>set asr.byteOrder = LE;<br>set asr.sampleRate = 8000;<br>set config.nBest = 2; |
| grammar | string | GRAMMAR REFERENCE (URL, LOCAL FILE, abnf source) |

FIG. 6B

REST API (REQUEST)

| FIELD | DESCRIPTION |
|---|---|
| ResultSet | CONTAINS ALL OF THE EXTRACTED TERMS. |
| Result | THE TEXT OF EACH EXTRACTED TERM. TERMS ARE RETURNED IN ORDER OF IMPORTANCE. |

FIG. 7

```
// create an ajax instance
window.ajax = createXHRObject();

// get the manager
var mgr = document.get.ElementById("audiomgr");

// create the AudioCapture object
window.audio = mgr.create(loglevel=warn;numbbufs=200;bufsize=400", fBufferReady);

var s = "cmd=load";
var b = new Buffer(s, null);
window.cb.put(b);

// some event handlers

// start recording
document.getElementById("start").onclick = function() (
    try (
        // clean up the buffer
        window.cb.init();

// queue up start command and configuration params
        // Use  :  to separace params
        var  s = "cmd=start" +
                "&server=" + window.watsonServer +
                "set asr.coding = linear;" +
                "set asr.byteOrder = LE;" +
                "set asr.sampleRate = 8000;" +
                "set config.nBest = 1";
        var b = new Buffer(s, null);
        window.cb.put(b);
        //start the audio capture
        window.audio.start();
        sendAudio();
        var status = document.getEelementById("status");
          status.bgColor="red";
    )
    catch(err) (
        alert("ERROR: " + err.description);
    )
)
```

FIG. 8

```
// ajax callback on request state changes
function handleRequestStateChange () (
    // continue if the process is completed
    if (window.ajax.readyState == 4) (
        // continue only if HTTP status id "OK"
        if (window.ajax.status == 200) (
            // retrieve the response
            var response |= ") (// assuming recon format
                try (
                    var r = oval("("+response+")"))
                    if (r i= null) (
                        ftrace("recording", "ASR Result: " + r.reco + "\nslots: "+
                        r.slot._city+" - "+r.slot._state"\n");
                    )
                ) catch (e) () // ignore errors
        )
        // whenever is ready. get a buffer and send it over
        var k = window.cb.got();
        if (b==null) (// not ready yet
            // wait few ms
            setTimeout ("sendAudio()", 50);
            return;
        )
        else (
            sendMessagePoor(window.ajax, window.url, b);
        )
    )
  )
)
```

Continued from Fig.8

```
//send audio buffer accumulated in the circular buffer
function sendAudio () (
    var b = window.cb.get() ;
    if (b==null) (// not ready yet or stopped
        if (!window.cb.stopping) (
            // wait few ms
            var wait=20; // this should be evaluated based on network speed
            setTimeout ("sendAudio()", wait);
        )
        else (
            if (!window.cb.stopped)  (// stopped audio
                var buf = new Buffer("cmd=stop", null);
                window.cb.put(buf); // queue up cmds
                send Audio ();
                window.cb.stopped=true;
            ) // all the buffers are comsumed
            else (
                var status = document.getElementById("status");
                status.byColor="green";
                return;)
        )
        return;
    )
    sendMessagePost(window.ajax, window.url. b);
)
```

SYSTEM AND METHOD OF PROVIDING SPEECH PROCESSING IN USER INTERFACE

PRIORITY CLAIM

The present application is a continuation of U.S. patent application Ser. No. 12/128,345, filed May 28, 2008, which is the non-provisional of U.S. Provisional Application No. 61/022,668, filed Jan. 22, 2008, the contents of which are incorporated herein by reference in their entirety.

BACKGROUND OF THE INVENTION

1. Field of the Invention

The present invention relates to speech processing and more specifically relates to providing speech processing in a user interface of a client device via a common network node that receives and processes speech and returns text to the client device.

2. Introduction

The present Disclosure generally relates to a desire and a need in the speech environment to improve on the ability of individuals and companies to create voice enabled services over a network. For example, typically, companies that utilize voice enabled services from such companies as Nuance and AT&T may often need to invest a large amount of money in a customized system. In a standard spoken dialog system, there are many components that need training and development in order to operate effectively to both receive speech from a user and generate it in an intelligent and conversational synthetic response. An automatic speech recognition (ASR) module converts a user's audible voice input into text. The text can be transmitted to a spoken language understanding (SLU) module which will seek to identify the intent or the purpose of the words spoken by the user. The output from the SLU module is communicated to a dialog management (DM) module which processes the meaning identified by the SLU module and generates an appropriate response. The substance of the response is transmitted to a text to speech synthesis (TTS) module which will synthesize an audio output that is communicated to and heard by the user. Various training data is utilized to communicate with each of these modules in order to enable the experience to be as life-like as possible for the user. For many companies, there is a large barrier to entry for building voice enabled services. Due to the high degree of expertise needed to provide any services utilizing such features as speech recognition or speech synthesis, the barrier can be very high. Complex components include speech processing engines, hardware, a large database of speech in order to make the experience realistic enough for users to be used and profitable, and so forth. A large investment in money and expertise is needed prior to generating any revenue for any aspect of a voice enabled service.

Because of this barrier, very few companies are capable of affording and building voice enabled services that don't own the engine or the servers. Those that do not own the speech processing engines, however, do have many profitable technologies that do not relate to voice enabled services. For example, many companies may know how to build and deploy a messaging system, communication system, or particular websites for performing a wide variety of web-based services. Websites such as Amazon.com and Travelocity.com have pioneered web-based processes for purchasing products online and reserving airfare, car rentals and hotel rooms.

What is needed in the art is an improved mechanism for enabling companies that already have expertise in one particular area to be able to build in a voice component into their website or other user interface without the need of spending a large amount of money to custom design, buy or license the complex engines and servers necessary for voice enabled services. Accordingly, what is needed generally in the art is an improved ability for users to be able to easily implement voice enabled services especially in the context of a browser on a desktop or laptop computer or via a mobile device.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention addresses the deficiencies set forth above and provides an architecture and a design that lowers the barrier of entry to make it easier for entities to write applications for any network but that can utilize an application programming interface (API) within the network that provides voice enabled services or speech technology from the network. The API would allow anybody anywhere to access the technology wherein a particular user-face can include a relatively small amount of code to have a voice enabled application written into it. The approach disclosed herein simplifies the creation of new services because the speech processing part is done in the network and accessible via an IP protocol rather than over a phone communication.

Embodiments of the invention include systems, methods and computer-readable media for enabling speech processing in a user interface of a device. The method embodiment includes receiving an indication of a field in a user interface of a device, the indication also signaling that speech will follow. One embodiment relates to a method of enabling speech processing in a user interface of a device. The method includes receiving an indication of a field in a user interface of a device, the indication also signaling that speech will follow, receiving the speech from a user at the device, the speech being associated with the field, transmitting the speech as a request to a public, common network node that receives speech, wherein the request comprises at least one standardized parameter to control a speech recognizer on the network node, receiving text associated with the speech from the network node at the device and inserting the text into the field.

An illustrative embodiment of this method in the context of a directory assistance service on a mobile device will be found in the body of the specification below. A system is described that performs the various steps of the method. Once the system receives an indication of a field in a user interface of the device, the system receives the speech from the user at the device, transmits the speech as an HTTP request to a network server, processes the transmitted speech and returns text associated with the speech to the device, and inserts text into the field. The network server represents a public, common network node that receives speech from one or more client devices. In this regard, this aspect of the disclosure enables a company to provide the ability of interacting with the user interface via speech to provide input into various fields of the interface without the need of developing or owning the various components of a voice enabled service as would normally be required. In one aspect, the system receives a second indication from the user and upon receiving the second indication, the system processes the text in the field as programmed by the user interface. The second indication from the user may signal that the speech intended for a particular field has ended and that the back-end processing should process the speech in return in the text into the input field on the device. Then, the second indication is essentially the equivalent of the context wherein, absent the voice enabled service associated with the interface, a user had typed into the field the desired text and hit an enter key or a search key for processing the request.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 6A illustrates a REST API request;

FIG. 6B illustrates a REST API response;

FIG. 7 illustrates a Javascript example;

FIG. 8 illustrates another Javascript example;

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
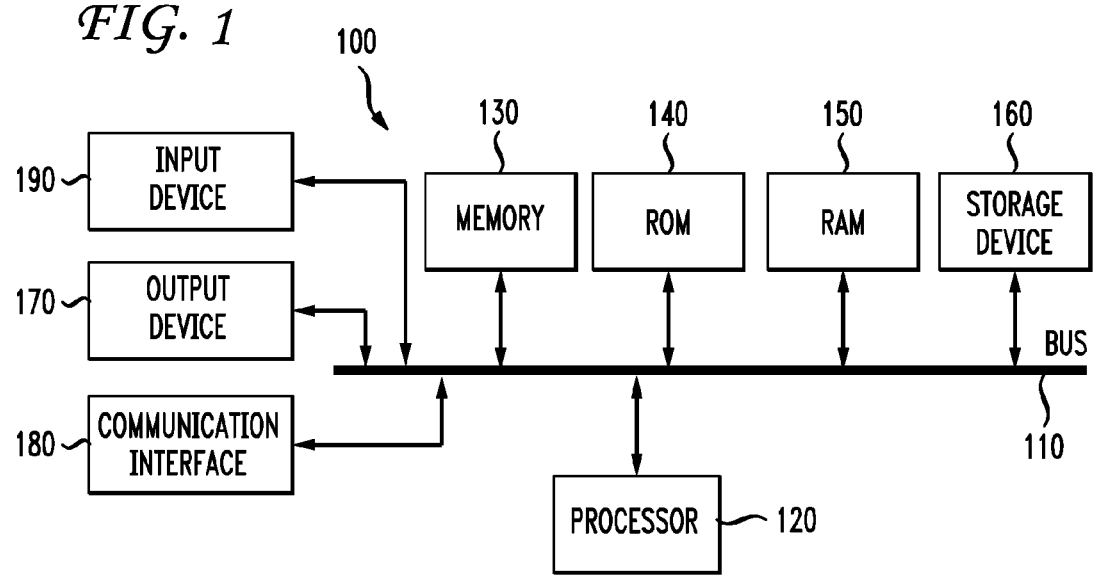
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

As noted above, the basic goal of the present disclosure is to provide speech technology inside of a network with an API that allows any device to access the technology and reduce the barrier to entry for those who provide applications and interfaces for desktops, laptops, and mobile devices. Thus, with the concepts disclosed herein, one of skill in the art of programming a standard user interface may be able to enhance that interface to provide additional voice or speech technologies without the need for spending a prohibitive amount of money or requiring a high level of expertise as has traditionally been the case.

Figure 2A:
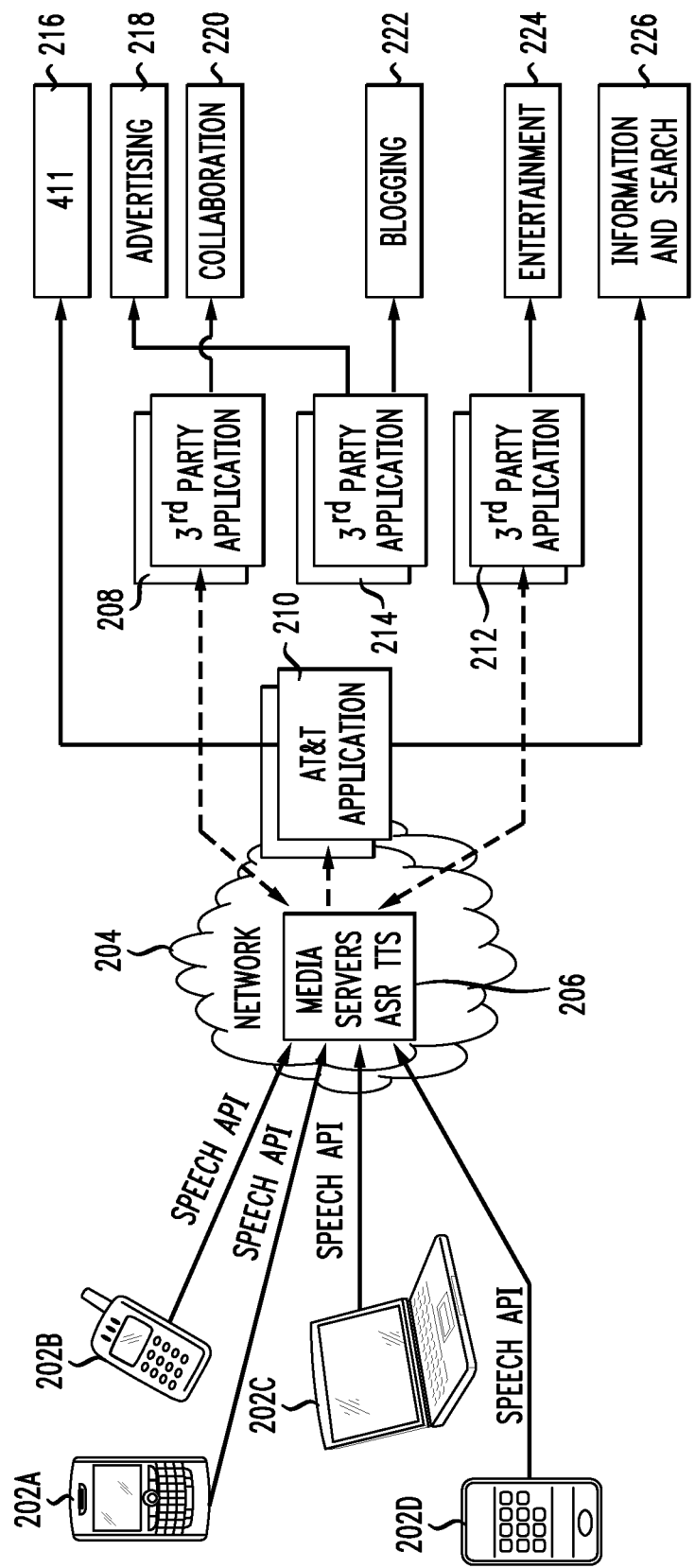
FIG. 2A illustrates a network based approach to providing a speech mash up architecture.

Therefore, an aspect of the disclosure is the combination of speech with web services. FIG. 2A illustrates a network 200 that provides the voice enabled services and APIs. Various edge devices are shown. For example, a smart phone 202A, a cell phone 202B, a laptop 202C and an iPhone 202D are shown. These are simply representative of the various types of devices and of course it is contemplated that any device, including a desktop computer, or any other type of device having a user interface may be applicable to the present invention. Each of these devices is a speech API that is used to access a database using a particular interface. The basic principles of this disclosure provide interoperability for distribution for voice enabled capabilities. For example, available web services provide users with an easy and convenient way to discover and exploit new services and concepts that can be operating system independent and enable mash ups or web application hybrids.

The basic concept of a mash up or a web hybrid is known in the art. A mash up is a web application that leverages the compositional nature of public web services. For example, one can be created when several data sources and services are "mashed up" or combined to create a new service. There are a number of known technologies used in the mash up environment. These include Simple Object Access Protocol (SOAP), Representational State Transfer (REST), Asynchronous JavaScript and XML (AJAX), Javascript, JavaScript Object Notiation (JSON) and various public web services such as Google, Yahoo, Amazon and so forth. These protocols are known to those of skill in the art but we shall provide a basic summary of each. SOAP is a protocol for exchanging XML-based messages over a network which is preferably done over HTTP/HTTPS. SOAP makes use of an internet application layer protocol as a transport protocol. Both SMTP and HTTP/HTTPS are valid application layer protocols used as transport for SOAP but HTTP is preferable. Several of the advantages of SOAP is that, via the use of HTTP, it allows easier communication between proxies and firewalls then other remote execution technology and it is versatile enough to allow the use of different transport protocols beyond HTTP, such as SMTP or RTSP.

REST is a design pattern for implementing network system and is intended to evoke an image of how a well designed web application behaves. For example, a network of web pages can be viewed as a virtual state machine wherein the user progresses through an application by selecting links as state transitions which result in the next page which represents the next state in the application being transferred to the user and rendered for their use. Technologies associated with the use of REST include HTTP and relative methods GET, POST, PUT and DELETE. Other features of REST include resources that can be identified by a URL and accessible through a resource representation which can include one or more of XML/HTML, GIF, JPEG, etc. Resource types can include text/HML, text/HTML, image/GIF, image/JPEG and so forth. Typically, the transport mechanism for REST is XML or JSON.

In an example of the REST representation, the client browser references a web resource using a URL such as www.att.com. A representation of the resource is returned via an HTML document. The representation places the client in a new state and when the client selects a hyper link such as index.html, it acts as another resource and the new representation places the client application into yet another state and the client application transfers state within each resource representation. These and other features of REST are known to those of skill in the art.

AJAX allows the user to send an HTTP request in a background mode and dynamically update the Document Object Model, or DOM, without reloading the page. The DOM is a standard, platform-independent representation of the HTML or XML of a web page. The DOM is used by Javascript to update a webpage dynamically. This is a feature that is supported by virtually any modern browser that supports Javascript.

JSON involves a light weight data-interchange format. The features of this aspect of the environment is that it is a subset of ECMA-262, $3^{rd}$ Edition and could be language independent. Inasmuch as it is text-based, light weight, and easy to parse, it provides a preferable approach for object notation.

These various technologies are utilized in the mash up environment and mash ups which would provide service and data aggregation are typically done at the server level, but there is an increasing interest in providing web-based composition engines such as Yahoo! Pipes, Microsoft Popfly, and so forth. Known in the art are different kinds of mash ups. For example, there are client side mash ups in which HTTP requests and responses are generated from several different web servers and "mashed up" on a client device. Also known are server side mash ups in which a single HTTP request is sent to a server which separately sends another HTTP request to a second server and receives an HTTP response from that server and "mashes up" the content and generates a single HTTP response to the client device which can update the user interface.

As introduced above, an aspect of the present disclosure is to provide speech mash ups. Speech resources can be accessible through a simple REST interface or a SOAP interface without the need for any telephony technology. An application client running on device (202A-202D) is responsible for audio capture. This may be performed through various approaches such as J2ME for mobile, .net, Java applets for regular browsers, Perl, Python, Java clients and so forth. The particular method or client application for audio capture is irrelevant to the present invention as long as audio capture is provided. Server side support is required for sending and receiving speech packets over HTTP or another protocol. This may be a process that is similar to the real-time streaming protocol (RTSP) inasmuch as a session ID may be used to keep track of the session when needed. Client side support is preferable for sending and receiving speech packets over HTTP, SMTP or other protocols. The system may use AJAX pseudo-threading in the browser or any other HTTP client technology. Also required is support for both client and server side mash up approaches as discussed above.

Returning to FIG. 2A, network 204 includes media servers 206 which can provide at least ASR and TTS technologies. The media servers 206 represent a common, public network node that processes received speech from various client devices. Servers 206 can communicate with various third party communications 208, 212. Another network-based application is shown as a network-based application 210. This may represent an application that provides such services as the 411 service 216. The benefits of this particular approach enable many new services and provide additional vendors and new business models for many different applications. As is shown, the various applications 208, 210, 212 and 214 may involve a number of different types of services and user interfaces. Several examples are shown. These include the 411 service 216, any type of advertising 218, collaborative efforts 220, blogging 222, entertainment 224 and information and search 226. These services provide only a general description of several different types of several different businesses or business models and of course any kind of interaction with a user interface may benefit from the basic speech mash up discussed herein. One advantage of the present invention is while many traditional web players are publishing their APIs (such as Yahoo! ®, Google™, Amazon® and so forth), mobile communication providers such as Vodafone and British Telecom are entering the service space by making telephony and mobile-based APIs available. By publishing advanced speech recognition APIs and TTS APIs as web services, this enables the opportunity to attract even more innovative concepts and ideas with potential revenues for a network based or the provider of such speech services.

One possible network that would be particularly suitable for the technologies disclosed herein is the IP Multi-media Subsystem (IMS). IMS wireline and wireless network seamless mobility and convergence of services and devices in one consistent architecture is an ideal environment for advanced speech and multi-modal services. The present invention also provides synergies with location based services, WIFI/3G (GPRS/EGPRS(EDGE)) mobility, instant messaging, presence information, video and picture sharing, conferencing, IPTV, Voice-over IP and so forth.

Figure 2B:
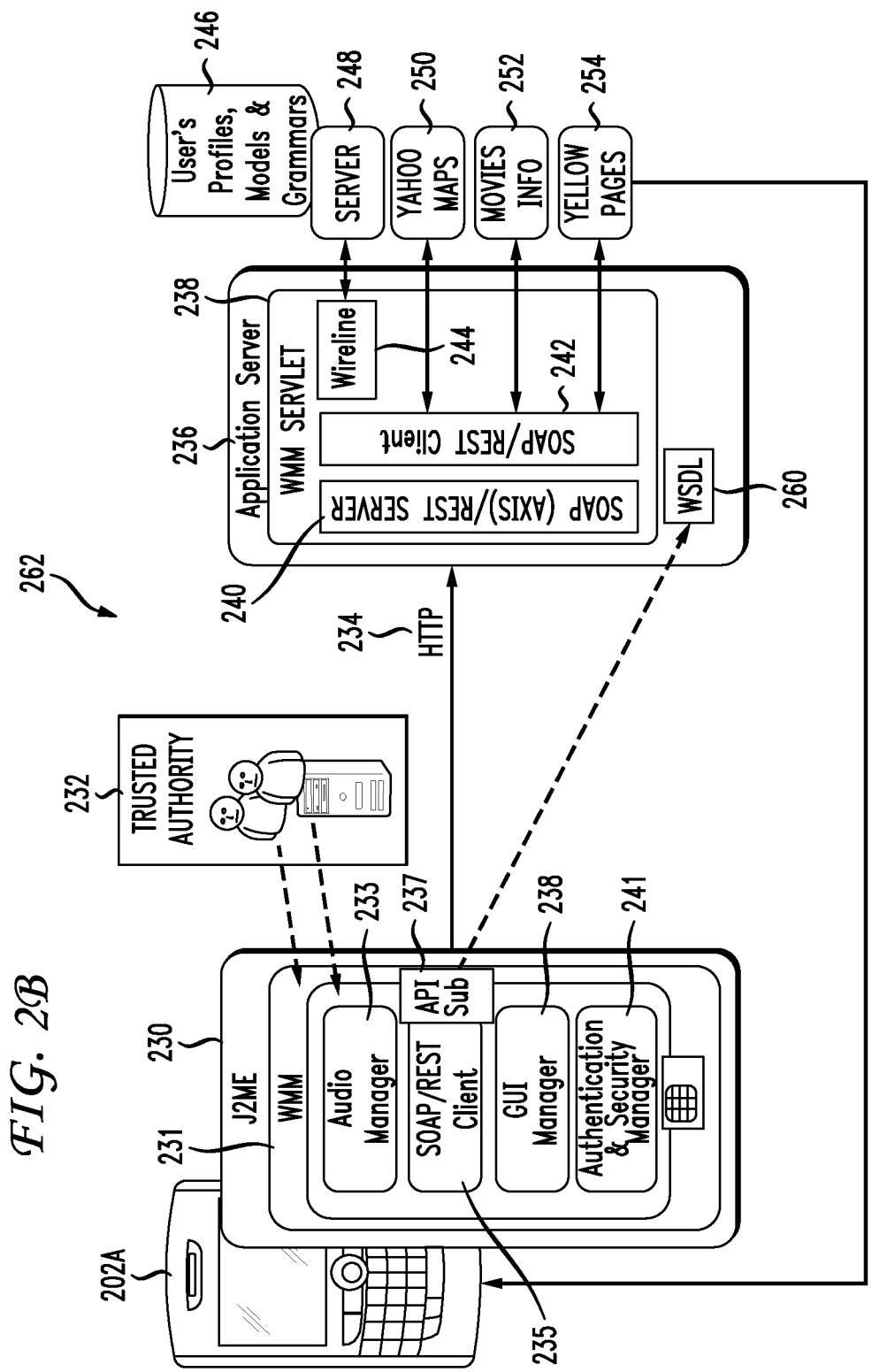
FIG. 2B illustrates an architecture for a speech mash up in a mobile context.

FIG. 2B illustrates a mobile context for a speech mash up architecture. The architecture 262 includes an example smart phone device 202A. This can be any mobile device by any manufacturer communicating via various wireless protocols. The various features in the device include various components 230 that includes the J2ME component for audio capture. A WIFI multi-media (WMM) application 231 may enable communication with a trusted authority such as entity 232 which provides access to SIM information and may provide manual validation by a company such as AT&T, Sprint or Verizon. An audio manager 233 captures audio from the device in a native coding format. A GUI Manager 239 abstracts the device grapple interface through J2ME polish and includes maps rendering and caching. An authentication and security manager 241 manages secure sockets, encrypted data transmission and allows access to the SIM information. A SOAP/REST client 235 and API stub 237 communicate with the ASR web service and other web applications via a protocol such as HTTP 234 or other protocols. On the server side, an application server 236 includes a WMM servlet 238 with such features as a SOAP(AXIS)/REST server 240 and a SOAP/REST client 242. A wireline component 244 communicates with an automatic speech recognition server that includes profiles, models and grammars 236 for converting audio into text. This server represents a public, common network node. The profiles, models and grammars may be custom tailored for a particular user as would be known in the art. For example, the profiles, models and grammars may be trained for a particular user and periodically updated and improved. The particular mechanism in which high accuracy speech recognition occurs is not necessarily an aspect of the invention but is assumed in the present case. The SOAP/REST client 242 communicates with various applications such as Yahoo! Maps 250, movies and information applications 252 and applications such as yellowpages.com 254. The API stub 237 in 230 communicates with a web services description language file 260 which is a published web service end point descriptor such as an API XML schema. Of course, as would be known, the various applications 250, 252 and 254 communicate data back to device 202A.

Figure 3:
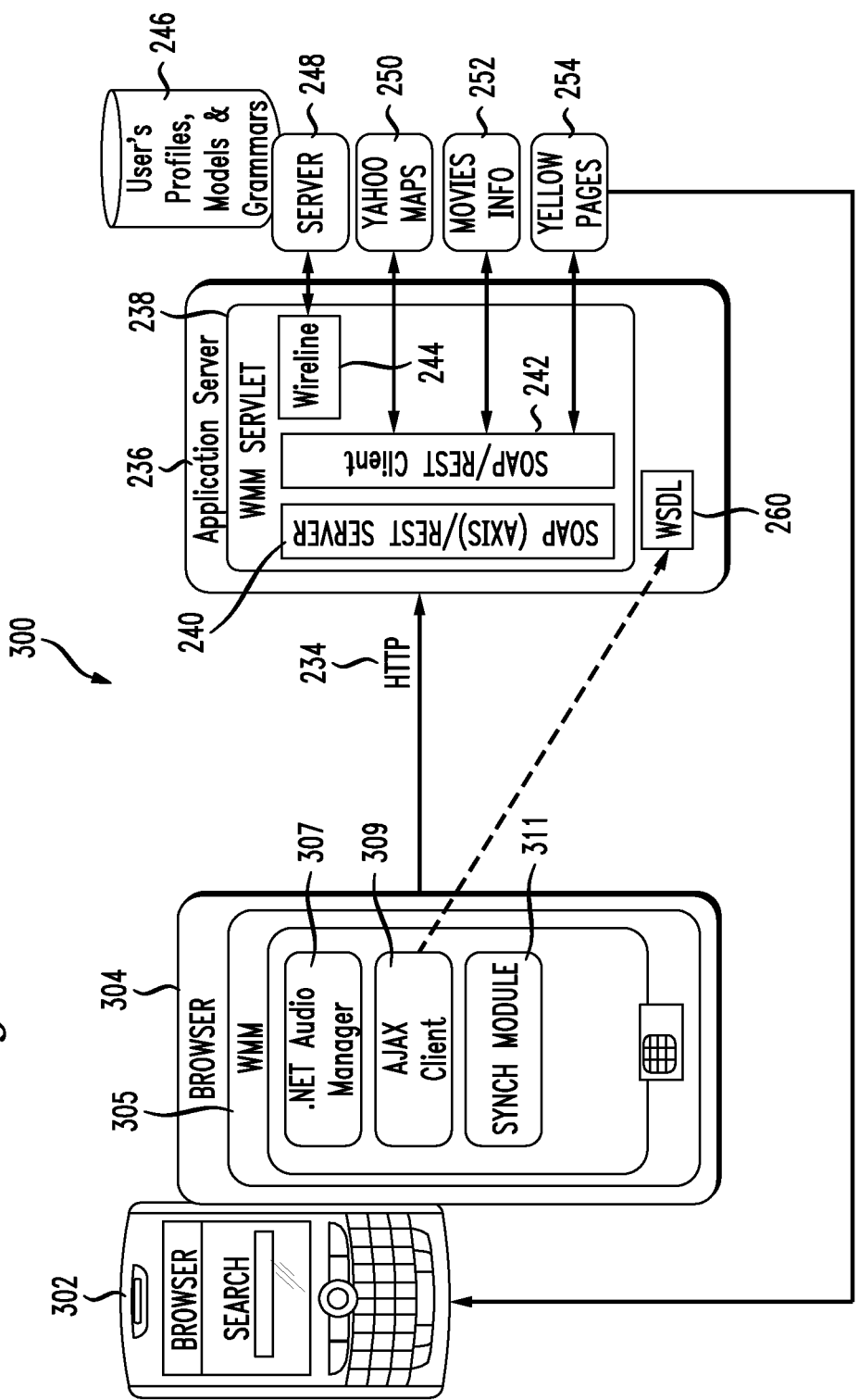
FIG. 3 illustrates a speech mash up architecture for a desktop context.

FIG. 3 illustrates a speech mash up architecture for a desktop. Feature 302 illustrates a browser which may be any browser such as Internet Explorer or Mozilla. The browser 304 includes various features such as a WMM 305, a .net audio manager 307 that captures the audio from the desktop audio interface, an AJAX client 309 which communicates with the ASR web service and other web applications, and a synchronization module such as JS Watson that manages the synchronization with the ASR web services, audio capture and the GUI (DHTML). Often software may be used to capture and process audio. Upon the receipt of audio from the user, the AJAX client 309 uses HTTP 234 or another protocol to transmit data to the application 236 and the WMM servlet 238. The SOAP(AXIS)/REST server 240 processes the HTTP request. The SOAP/REST client 242 communicates with various application servers such as Yahoo! Maps 250, movies and information 252, and Yellow Pages 254. A wireline module 244 communicates with an ASR server 248 that utilizes the user profiles, models and grammars 246 in order to convert the audio into text. As would be known in the art, there may be differences in how the user profiles, models and grammars are gathered and processed in a desktop environment as opposed to a mobile environment. However, it is assumed that the speech recognition occurs in an acceptable manner. The web services description language file 260 is included in the application server 236 and provides information about the API XML schema to the AJAX client.

Figure 4:
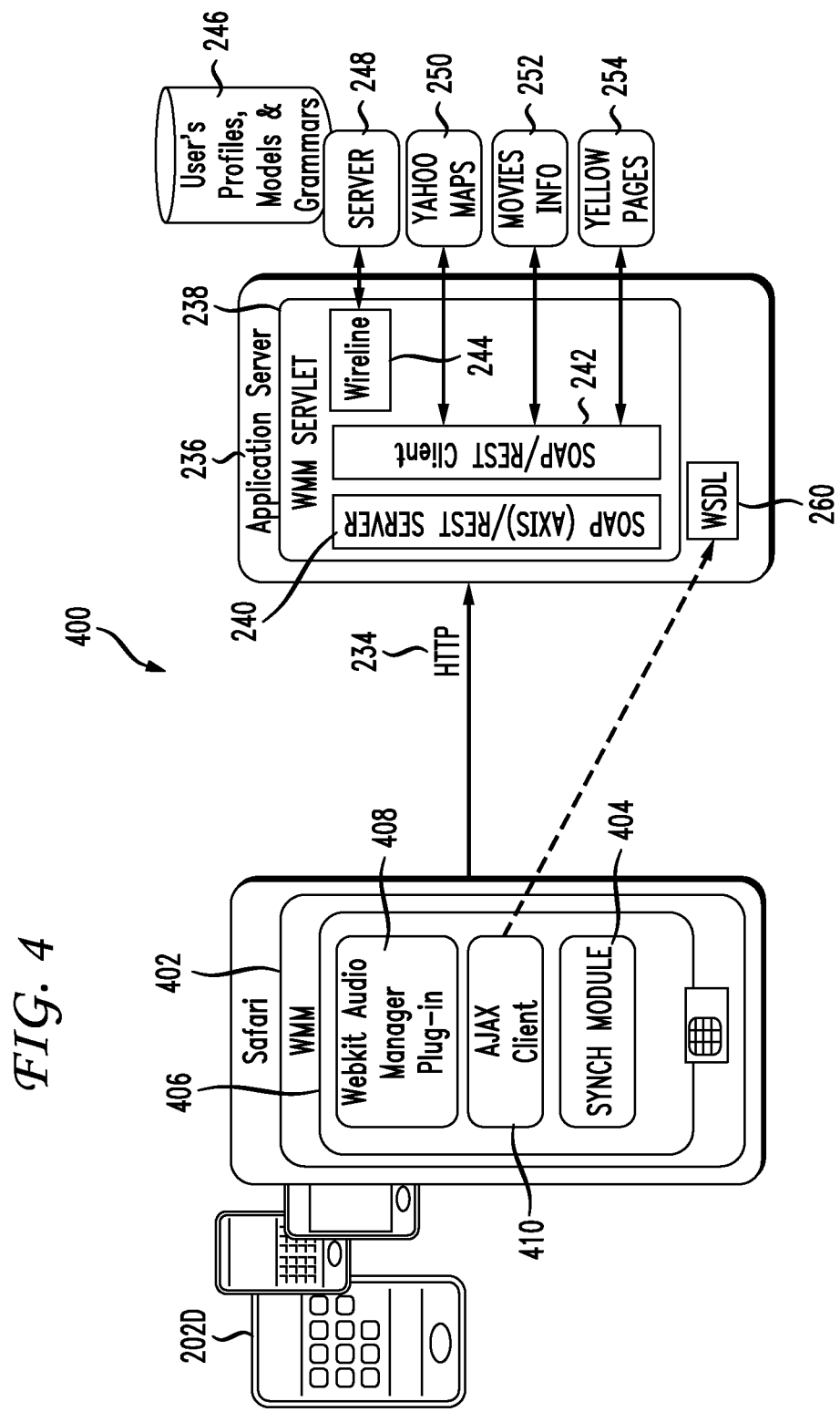
FIG. 4 illustrates a speech mash up architecture for an Apple operating system.

FIG. 4 illustrates the speech mash up architecture 400 for an Apple operating system such as OSX. Device 202D is an example iPhone which includes a modified version of the Safari browser 402. The WMM 406 includes such features as a Web Kit Audio Manager Plug-in 408 that captures the audio from the desktop interface, an AJAX client 410 and a synchronization module 404, for example the JS Watson module, that manages the synchronization with the automatic speech recognition server, audio capture and the GUI (DHTML). Upon audio capture, the AJAX client 410 provides the HTTP 234 information to the application server 236 and the WMM servlet 238. The SOAP(AXIS)/REST server 240 processes the HTTP request. The SOAP/REST client 242 communicates with various applications 250, 252 and 254. Similar to the manner noted above, the wireline module 244 communicates with server 248 using profiles, models and grammars 246 to respond to provide the text associated with the audio. And the WSDL component 260 communicates with the AJAX client 410 in a manner similar to that discussed above. AJAX client 410 can communicate with WSDL 260 in the application server 236.

Figure 5:
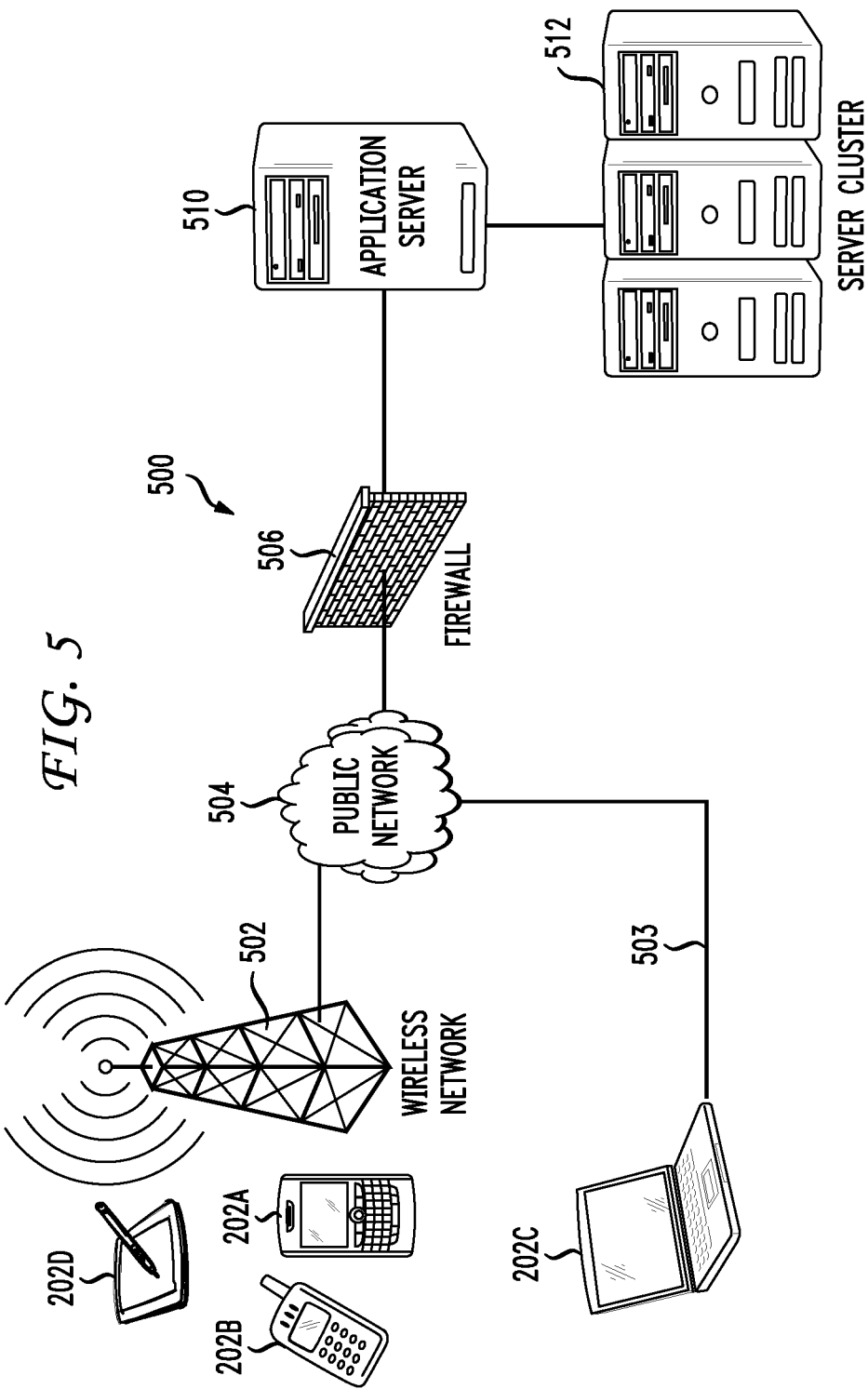
FIG. 5 illustrates the physical components of a network associated with a speech mash up architecture.

FIG. 5 illustrates the physical components of the speech mash up architecture. The various devices 202A-D communicate either through a wireline 503 or a wireless network 502 to a public network, the Internet, or other communication network 504. A firewall 506 is placed between the public network 504 and the application server 510. A server cluster 512 may be used to process the incoming speech. FIG. 6A illustrates a REST API example for a request. Included in this figure are the descriptions of various parameter subsets that provide example embodiments of how an API would enable the speech processing in a user interface. For example, under the CMD parameter, the description includes the concept that the ASR command string may provide a start indication to start automatic speech recognition and a stop indication to stop automatic speech recognition and return the results (See example use in FIG. 9, center window). There can be an audio buffer available and the opportunity to compile a specified grammar. Thus, these command strings may control use of the buffer or compilation or application of various grammars. Other control strings include data to control a byte order, coding, sampling rate, n-best results and so forth. If a particular control code is not included, default values are assumed. The REST API can also include other features such as a grammar to identify a particular grammar reference that can be associated with a user or a particular domain and so forth. The REST API includes a grammar parameter that will identify a particular grammar for use in the travel industry, the information industry, the searching industry, Yellow Pages directory assistance context and so forth. Furthermore, the REST API provides a parameter associated with a particular grammar for a user that is selected from a group of grammars such that the appropriate grammar may be used to provide the highest quality speech recognition for a particular user. Other REST APIs can also be location-based. For example, using a location based service, a particular mobile device may be found at a particular location, and the REST API may automatically insert a particular parameter that may be associated with a particular location. This may cause a modification or the selection of a particular grammar for use in the speech recognition In an exemplary embodiment, the system combines the current location of a tourist, like Gettysburg, with the home location of the tourist, like Texas. The system selects an appropriate grammar based on what the system is likely to encounter when interfacing with individuals from Texas visiting Gettysburg. The system selects a grammar to anticipate either a Texas southern drawl accent or a Hispanic accent. The system selects a grammar to anticipate a likely vocabulary for tourists at Gettysburg, taking in to account prominent attractions, commonly asked questions, or other words or phrases. The system can automatically select a grammar based on available information, the system can present its best guess for a grammar to the user for confirmation, or the system can offer a list of grammars to the user for a selection of the most appropriate.

FIG. 6B illustrates an example REST API response that includes a field ResultSet that contains all of the extracted terms and a Result field that is described as the text of each extracted term and in which terms are returned in the order of importance.

FIG. 7 illustrates an Internet Explorer Javascript example. This example and other Internet Explorer Javascript examples of course may be modified as would be known in the art to other types of user interfaces or other browsers. This example creates an audio capture, and sends initial parameters and begins speech recognition.

Figure 9:
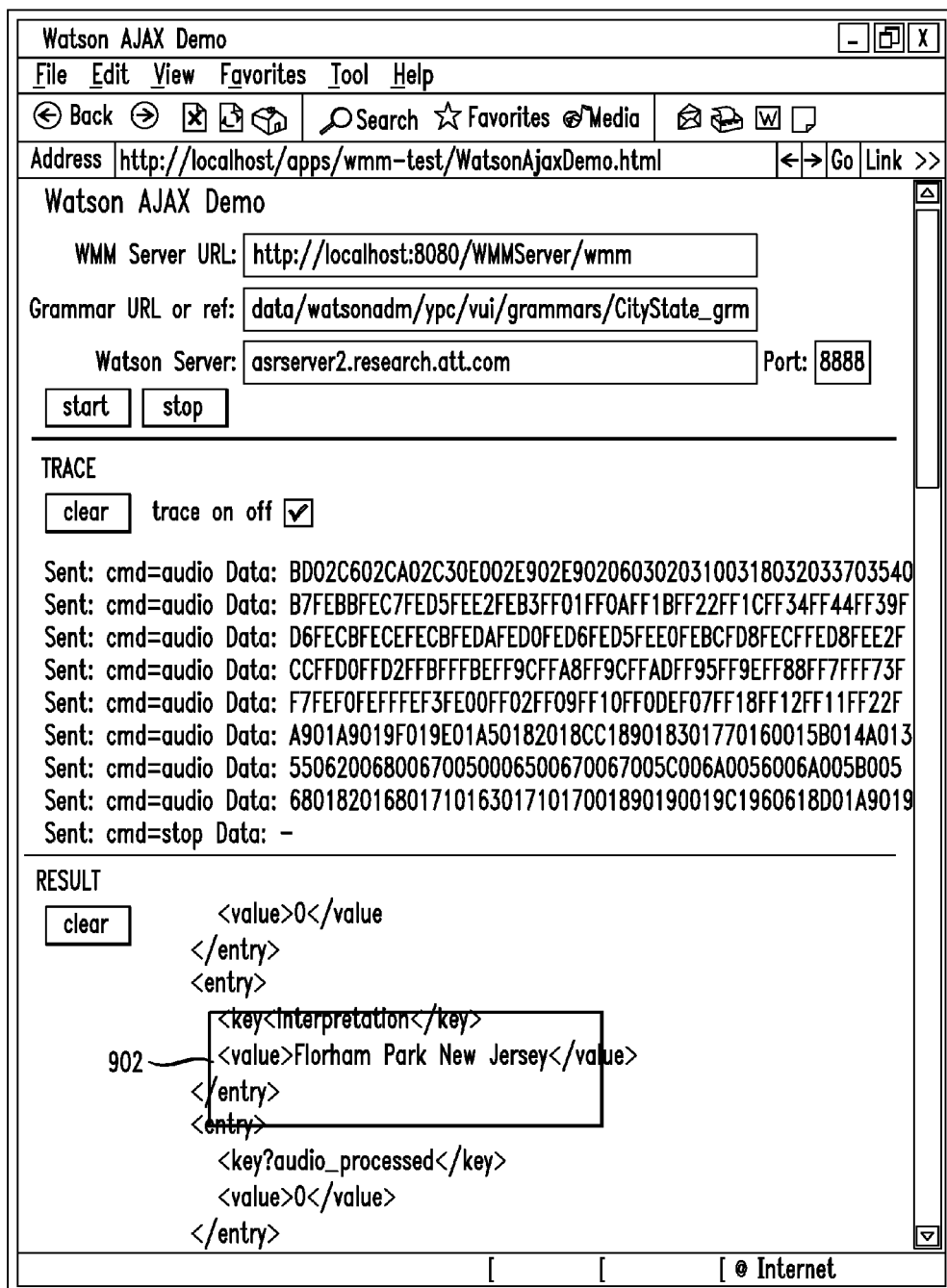
FIG. 9 illustrates an example of browser-based speech interaction with AJAX.

FIG. 8 illustrates an example Javascript for Internet Explorer. This example provides for pseudo-threading and sending audio buffers. FIG. 9 illustrates a window 900 as part of a Watson AJAX demonstration. This illustrates the return of audio wherein the user stated "Florham Park, New Jersey" and the interpretation is accomplished via an automatic speech recognition server at a common, public network node and the words "Florham Park, New Jersey" 902 are returned. Note that in FIG. 9, there is a field that points via a URL to a public WMM server, a field that specifies a grammar URL and a field that identifies a Watson Server in the example of when AT&T providing the services. This grammar string points to a network location of a grammar that the speech recognizer can use in speech recognition. Shown in the center section of this window is the sent data and the lower field shows an example of the returned result for speech recognition.

Figure 10:
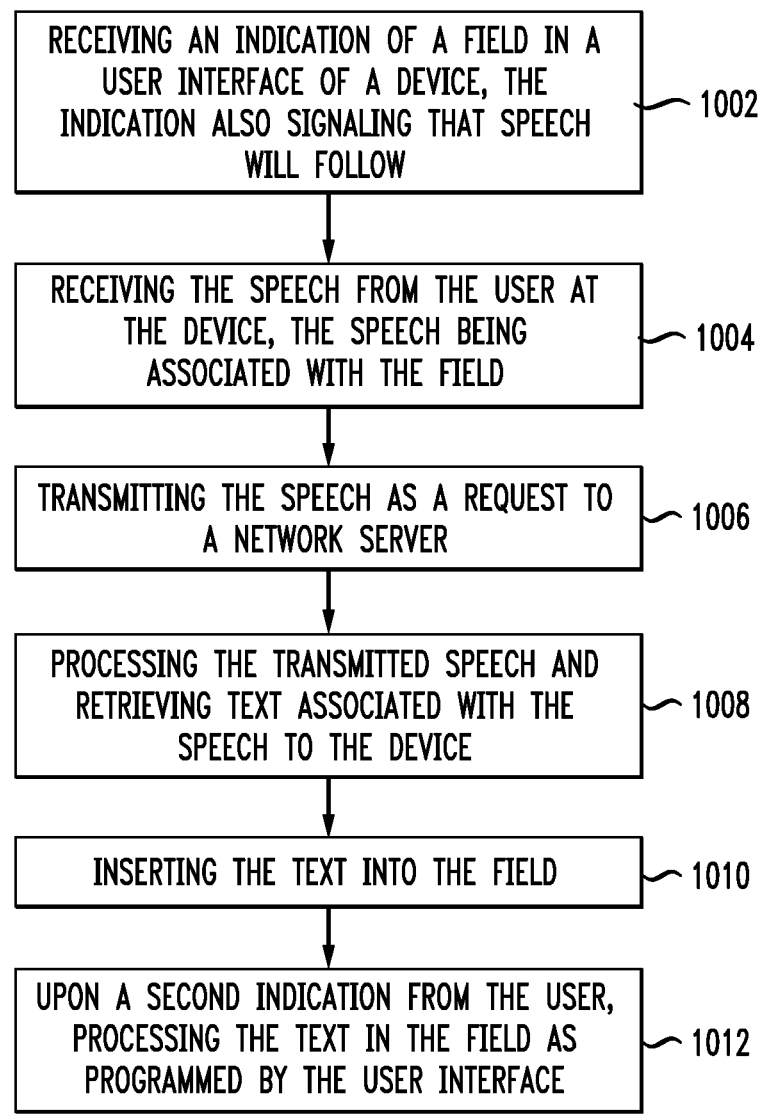
FIG. 10 illustrates a method embodiment of the invention.
Figure 11A:
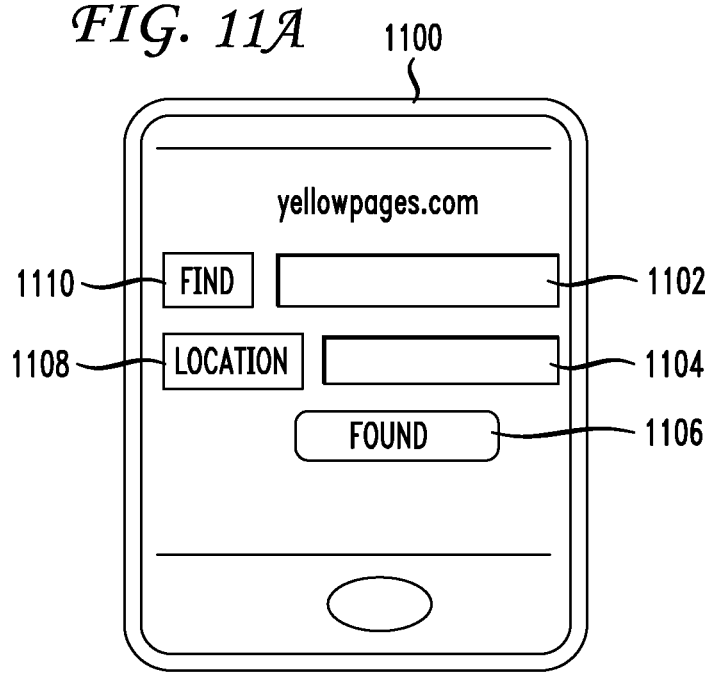
FIG. 11A illustrates an example user interface for a particular application.

FIG. 10 illustrates a method embodiment of the invention. This method enables speech processing in a user interface of a device. This method shall be discussed in the context of an example embodiment Yellow Pages application in which a user can insert an address and receive back a map on how to get to a particular location. The method includes receiving indication of a field in a user interface of a device, the indication also signaling that speech will follow (1002). This example will be discussed with reference both to FIG. 10 and FIGS. 11A-D. This is an illustration of a voice enabled application on a mobile device using a network based speech recognizer which is interfaced directly with a yellowpages.com mobile web site. As is shown in FIG. 11A, the interface 1100 includes several fields, including a find field 1102 and a location field 1104. A find button 1106 enables the user, once the fields 1102 and 1104 are populated, to click find to process the request. First, a user may click on the word location 1108 from which the system will receive an indication of the field in the user interface 1100 wherein the indication also signals that the user is about to speak. At this point, the user may provide the location information and state "Florham Park, New Jersey". The user clicks on the location button 1108 again which can be an ending indication which is received after the system receives the speech. This ending indication from the user notifies the system that the speech that was intended for being input into field 1104 has ceased.

The system receives the speech from the user at the device, the speech being associated with the field (1004). The system transmits the speech as a request to a public, common network node that receives speech. The request includes at least one standardized parameter to control a speech recognizer in the network node (1006). The client device controlled by the user will receive text associated with the speech at the device and insert the text into the field (1010).

Next, the user clicks on button 1110 which labels the find field 1102. Again, this is another example wherein the system will receive an indication of another field in the user interface of the device which also signals that speech will follow. Here, after the user touches the find label 1110, the user says "Japanese Restaurants." The user then touches the find button again which is an ending indication from the user that the speech has ceased. The system then again performs steps 1004-1010 to process the speech "Japanese Restaurants" to recognize the speech and return the text and insert it into the Find field 1102. Based on these two interactions, the user has indicated that they want to find Japanese restaurants in Florham Park, N.J. As noted above, a step in the method involves receiving a speech from the user at the device, the speech being associated with the field 1104. Optionally, the user may provide a second indication notifying the system to start processing the text in the field as programmed by the user interface (1012).

Figure 11B:
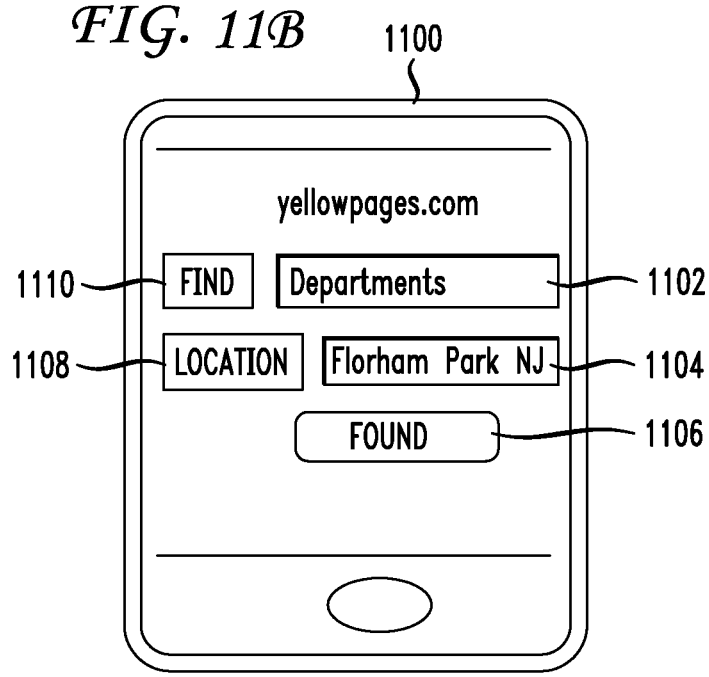
FIG. 11B illustrates populated fields in a user interface.

FIG. 11B illustrates the scenario wherein after the user has touched the location button 1108, spoken the words "Florham Park, New Jersey" and touched the location button 1108 again. This second touching of the button indicates to the system that the speech that is intended to be processed as concluded and to recognize that speech. Any kind of indication may be provided, such as a button click, a speech code such as "end" or multimodal input that indicates that the speech intended for the field has ceased. The resulting text "Florham Park, New Jersey" is inserted into the field 1104 in the user interface. Similarly, the text "Japanese restaurants" is shown in FIG. 11B as being inserted into field 1102. The step discussed above, regarding the second indication from the user, by way of example, will involve touching the find button 1106 of interface 1100. This indication may also be thought of in the context of, for example, a search embodiment, wherein the user had engaged in the speech process to achieve the insertion of text into a Google search field, and wherein the user indicates that it is time to carry out the search by touching the search button. The text is processed in a standard fashion according to the normal programming of the interface, absent any speech enabled technologies. In this regard, processing text in the field after the second indication occurs as though the user had typed the text in the field and thus the standard programming for the interface does not need to change. As has been noted above, transmitting the speech to the network server and returning text may be performed by one of a REST or SOAP interface (or any other web-based protocol) and may be transmitted using an HTTP, SMTP, a protocol similar to Real Time Messaging Protocol (RTMP) or some other known protocol such as MRCP, SIP, TCP/IP, etc. or a protocol developed in the future Further aspects of this disclosure also relate to FIG. 10. For example, typically, once the text is received from the ASR server, it is inserted into the appropriate field 1102, 1004. Then the user must provide an indication to process that text by clicking the "found" button 1106. The purpose of this may be to enable the user to preview the text before processing the data in the field. One aspect of the disclosure removes this step in the process. Here, the server may send an indication with the processed text that causes the user interface to process the insert text without further user input. This may optionally be done only if the speech recognizer recognizes speech according to a confidence threshold. Therefore, for example, if the speech recognizer has at least 90% confidence that the speech was recognized correctly, it can transmit an instruction with the recognized text such that the text is inserted into the field and the instruction performs the "find" clicking operation for the user. There may be some notification accompanying this process to notify the user that the find operation is being performed and that they do not need to do anything further but to view the results of the operation. This may be an audible, visual or combination of queues indicating that the operation is being performed for the user. This feature could also be enabled or disabled depending on the application.

In another aspect, the system may only present an action button such as the "find" button 1106 associated with the text in the field only if a confidence level from the speech recognizer is below a threshold. In this case, the returned text would be inserted into the field and then processed without further user input. The "find" button may be replaced with an indication of processing such as "Searching for Japanese Restaurants . . . " In another aspect, if the speech recognizer returns two possible interpretations of the speech, then the system may inserting each possible interpretations into a separate text field, present both fields to the user with an indication instructing the user to select which text field to process. Here, different "find" buttons may be presented next to different fields. The user can then view both simultaneously and only have to enter in a single action by clicking on the appropriate "find" button to process the desired request.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in standalone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

The invention claimed is:

1. A method comprising:
  receiving, via touch provided on a touch screen of a device, an indication associated with a specific field displayed in a user interface on the touch screen, the indication signaling that speech, which is associated with the specific field, will follow;
receiving the speech via the device;
generating speech data based on the speech;
generating, via the device, a request for speech recognition, wherein the request comprises:
  (1) an application identifier identifying a speech recognizer;
  (2) a current location of the device; and
  (3) a grammar parameter associated with a home location of a speaker of the speech;
transmitting the speech data and the request to a network node for speech recognition using the speech recognizer;
receiving, at the device, a transcription of the speech from the speech recognizer; and
inserting the transcription into the specific field.

2. The method of claim 1, further comprising, upon a second indication from a user, processing the transcription in the specific field.

3. The method of claim 2, wherein the processing of the transcription comprises initiation of a search using the transcription.

4. The method of claim 3, wherein the search is conducted using a search engine.

5. The method of claim 1, further comprising, after receiving the speech, receiving a second touch indication from a user that the speech intended for the specific field has ceased.

6. The method of claim 2, wherein processing the text in the specific field is performed as though the user typed the text in the specific field.

7. The method of claim 1, wherein transmitting the speech data and the request to the network node is performed using one of a representational state transfer protocol, a simple object access protocol, and a web-based protocol.

8. The method of claim 1, wherein the application identifies an application which converts the speech data to the transcription, wherein the application is executed on the network node.

9. The method of claim 1, wherein the grammar parameter controls a compilation of a plurality of grammars.

10. The method of claim 1, further comprising presenting an action button associated with the transcription in the specific field only when a confidence level from the speech recognizer is below a threshold.

11. The method of claim 1, wherein when the speech recognizer returns multiple possible interpretations of the speech data, inserting each possible interpretation into a separate text field with an indication instructing a user to select which text field to process.

12. A system comprising: a processor; and
a computer-readable storage medium having instructions stored which, when executed by the processor, cause the processor to perform operations comprising:
  receiving, via touch provided on a touch screen of the system, an indication associated with a specific field displayed in a user interface on the touch screen, the indication signaling that speech, which is associated with the specific field, will follow;
  receiving the speech via the system;
  generating speech data based on the speech;
  generating, via the system, a request for speech recognition, wherein the request comprises:
    (1) an application identifier identifying a speech recognizer;
    (2) a current location of the system: and
    (3) a grammar parameter associated with a home location of a speaker of the speech;
  transmitting the speech data and the request to a network node for speech recognition using the speech recognizer;
  receiving, at the system, a transcription of the speech from the speech recognizer; and inserting the transcription into the specific field.

13. The system of claim 12, the computer-readable storage medium having additional instructions stored which, when executed by the processor, cause the processor to perform operations comprising, upon a second indication from a user, processing the transcription in the specific field.

14. The system of claim 13, wherein the processing of the transcription comprises initiation of a search using the transcription.

15. The system of claim 14, wherein the search is conducted using a search engine.

16. The system of claim 12, the computer-readable storage medium having additional instructions stored which, when executed by the processor, cause the processor to perform operations comprising, after receiving the speech, receiving a second touch indication from a user that the speech intended for the specific field has ceased.

17. The system of claim 13, wherein processing the text in the specific field is performed as though the user typed the text in the specific field.

18. The system of claim 12, wherein transmitting the speech data and the request to the network node is performed using one of a representational state transfer protocol, a simple object access protocol, and a web-based protocol.

19. The system of claim 12, wherein the application identifies an application which converts the speech data to the transcription, wherein the application is executed on the network node.

20. A computer-readable storage device having instructions stored which, when executed by a computing device, cause the computing device to perform operations comprising:
  receiving, via touch provided on a touch screen of the computing device, an indication associated with a specific field displayed in a user interface on the touch screen, the indication signaling that speech, which is associated with the specific field, will follow;
  receiving the speech via the computing device;
  generating speech data based on the speech;
  generating, via the computing device, a request for speech recognition, wherein the request comprises:
    (1) an application identifier identifying a speech recognizer;
    (2) a current location of the computing device; and
    (3) a grammar parameter associated with a home location of a speaker of the speech;
  transmitting the speech data and the request to a network node for speech recognition using the speech recognizer;
  receiving, at the computing device, a transcription of the speech from the speech recognizer; and
  inserting the transcription into the specific field.

* * * * *